(12) United States Patent
Stiefel et al.

(10) Patent No.: US 10,332,069 B2
(45) Date of Patent: Jun. 25, 2019

(54) SYSTEM AND METHOD FOR MANAGING RETAIL PRODUCT INVENTORY

(71) Applicant: Walmart Apollo, LLC, Bentonville, AR (US)

(72) Inventors: Tom Stiefel, Bentonville, AR (US); Justin C. Moore, Fayetteville, AR (US); Richard B. Penn, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/812,480

(22) Filed: Nov. 14, 2017

(65) Prior Publication Data

US 2018/0137460 A1    May 17, 2018

Related U.S. Application Data

(60) Provisional application No. 62/422,401, filed on Nov. 15, 2016.

(51) Int. Cl.
*G06Q 10/00* (2012.01)
*G06Q 10/08* (2012.01)
(Continued)

(52) U.S. Cl.
CPC ....... *G06Q 10/087* (2013.01); *G06K 19/0722* (2013.01); *G06K 19/0723* (2013.01); *G06Q 20/203* (2013.01)

(58) Field of Classification Search
CPC ............. G06Q 10/087; G06Q 20/203; G06K 19/0722; G06K 19/0723
(Continued)

(56) References Cited

U.S. PATENT DOCUMENTS 6,476,708 B1 *  11/2002  Johnson ............... G06K 7/0008
                                                340/10.34
7,716,180 B2    5/2010   Vermeulen
(Continued)

FOREIGN PATENT DOCUMENTS

JP        2010108013        5/2010

OTHER PUBLICATIONS

PCT; App. No. PCT/US2017/060153; International Search Report and Written Opinion dated Jan. 18, 2018.
(Continued)

*Primary Examiner* — Oluseye Iwarere
(74) *Attorney, Agent, or Firm* — Fitch, Even, Tabin & Flannery LLP (57) ABSTRACT

In some embodiments, system, apparatuses, and methods are provided herein useful for managing retail product inventory including a plurality of sensors configured to detect individual presence of multiple different products within a retail shopping facility. A central control system communicatively coupled with the plurality of sensors to receive sensor information comprising identifiers detected by the plurality of sensors. The central control system comprises a central control circuit coupled with memory storing code that when implemented causes the central control circuit to: access the received sensor information and determine, at a current time and for each detected first product, a confidence value corresponding to a level of confidence that the first product is still present and within a first threshold area corresponding to a first location where the first product was most recently sensed. The confidence value may decay over time proportional to a first decay period of time.

22 Claims, 4 Drawing Sheets

(51) Int. Cl.
*G06K 19/07* (2006.01)
*G06Q 20/20* (2012.01)

(58) Field of Classification Search
USPC .......................................................... 705/28
See application file for complete search history.

(56) References Cited

U.S. PATENT DOCUMENTS

| | | |
|---|---|---|
| 7,859,411 B2 | 12/2010 | Chakraborty |
| 8,175,925 B1 | 5/2012 | Rouaix |
| 9,865,027 B2 * | 1/2018 | Arce ..................... G06T 1/0021 |
| 2003/0163394 A1 * | 8/2003 | Munn ................... G06Q 10/087 |
| | | 705/28 |
| 2004/0153380 A1 * | 8/2004 | Tsai ..................... G06Q 10/087 |
| | | 705/28 |
| 2009/0037403 A1 | 2/2009 | Joy |
| 2010/0156597 A1 * | 6/2010 | Stern .................... G06K 7/0008 |
| | | 340/5.92 |
| 2011/0010196 A1 * | 1/2011 | Nee ..................... G06F 19/3456 |
| | | 705/3 |
| 2011/0225023 A1 | 9/2011 | Evens |
| 2014/0266618 A1 * | 9/2014 | Jones .................... G06Q 10/08 |
| | | 340/10.1 |
| 2014/0279294 A1 | 9/2014 | Field-Darragh |
| 2015/0227884 A1 | 8/2015 | Timm |

OTHER PUBLICATIONS

Simon, Robin; "The 2nd Most Important Measure: % ACV Distribution"; http://www.cpgdatainsights.com/distribution/2nd-most-important-part1/; Nov. 7, 2012; pp. 1-8.

* cited by examiner

SYSTEM AND METHOD FOR MANAGING RETAIL PRODUCT INVENTORY

CROSS-REFERENCE TO RELATED APPLICATION

This application claims the benefit of U.S. Provisional Application No. 62/422,401, filed Nov. 15, 2016, and is incorporated herein by reference in its entirety.

TECHNICAL FIELD

This invention relates generally to managing retail product inventory in a retail shopping facility, and more particularly, to managing retail product inventory using a plurality of sensors.

BACKGROUND

An accurate understanding of quantities of inventory of various products can be critical to retail shopping facilities. Many factors can affect accurate inventory information. Accordingly, there is a need to improve inventory management.

BRIEF DESCRIPTION OF THE DRAWINGS

Disclosed herein are embodiments of systems, apparatuses and methods pertaining to managing retail product inventory. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Accuracy of product inventories can be crucial to a retail shopping facility's business advantage. In some instances, a retail shopping facility may verify and count its product inventories. Counting may be performed at least in part using tag readers to determine quantities of items and/or products on-hand so that items and/or products that need replenishing or restocking are identified. A product may generally refer to a grouping of the same kind of item. For example, a product may correspond to 16 oz KELLOGG'S SPECIAL K Original Cereal. However, an item may correspond to one 16 oz KELLOGG'S SPECIAL K Original Cereal out of fifty 16 oz KELLOGG'S SPECIAL K Original Cereal listed in an inventory. Thus, there may have several number of items in a product. Each item of the number of items in the product may be associated with an identifier, such as a tag, among other means of identification.

Generally one or more tag readers may identify that an item of a particular product is at a location or had been at the location by reading a tag associated with the item and by obtaining information associated with the tag. In some inventory systems, the item is considered to be at a location until another tag reader reads and/or identifies that the item is at another location. However, a customer may move the item to another location without the one or more tag readers reading the tag prior to the move. For example, a first tag reader located proximate a first area of the sales floor of the retail shopping facility may have read the tag associated with the item at a first time. At a second time, a customer may have carried and left the item at a shelf located in a second area of the sales floor of the retail shopping facility. In one scenario, the first tag reader associated with the first area of the sales floor may have failed to read the tag at the second time due to the tag being hidden under another item or rendered unreadable due to an obstruction between the tag and the first tag reader's line of sight (i.e., three-dimensional zone of detection). In another scenario, the first tag reader may just simply fail to read the tag due to a weak and/or lack of signal reflection from the tag.

In another example, a second tag reader associated with the second area of the sales floor may have read the tag. Sensor information communicated by the second tag reader to a central control system, an inventory system, a business decision system, or other such system associated with the shopping facility may indicate that the item is now located on the second area. By one approach, the central control system may manage retail product inventory in the retail shopping facility. By another approach, one or more business decision systems may manage the retail product inventory in the retail shopping facility. Further, the central control system may receive a plurality of sensor information from a plurality of tag readers, where the sensor information includes data indicating locations of a plurality of items in the retail shopping facility. In one scenario, the item may have been sold to a customer and no longer in the retail shopping facility. However, in an inventory system of the retail shopping facility, the item may be indicated as being located in the first area of the sales floor. As such, there may be times where information regarding quantities and locations of items of a product may be totally and/or partially inaccurate in the inventory system. Generally, in attempts to correct inaccuracies of the inventory of the product, the retail shopping facility may have to physically count the quantity of items of the product that are actually in the retail shopping facility. However, physical accounting of inventories may not be possible at times, can be time consuming, and may not provide an accurate count. Thus, it would be desirable to have one or more options and/or alternatives to physical accounting of products in the inventory system of the retail shopping facility.

Generally speaking, pursuant to various embodiments, systems, apparatuses and methods are provided herein useful for managing retail product inventory. In some embodiments, there is provided a system for managing retail product inventory including a plurality of sensors distributed through a retail shopping facility. The plurality of sensors may detect individual presence of each of a plurality of items of a plurality of products within the retail shopping facility. The system may include a central control system communicatively coupled with the plurality of sensors to receive sensor information. The sensor information includes identifiers of each of the plurality of items detected by the plurality of sensors. The central control system may include a central control circuit coupled with memory storing code that when implemented may cause the central control circuit to access the received sensor information. The code, when implemented, may also cause the central control circuit to determine, at a current time and for each detected first item of the plurality of items, a confidence value corresponding to a level of confidence that the detected first item is still present at a first location where the detected first item was most recently sensed. By one approach, the confidence value may be determined as a function of time from a most recent sensing of the detected first item such that the confidence value decays over time proportional to a first decay period of time.

In some embodiments, there is provided a method for managing retail product inventory including accessing, by a central control system of a retail shopping facility, sensor information received from a plurality of sensors distributed through the retail shopping facility. The plurality of sensors may detect individual presence of each of a plurality of items of a plurality of products within the retail shopping facility. The sensor information may include identifiers of each of the plurality of items detected by the plurality of sensors. The sensor information may also include determining, at a current time by the central control system, for each detected first item of the plurality of items a confidence value as a function of time from a most recent sensing of the detected first item such that the confidence value decays over time proportional to a first decay period of time. By one approach, the confidence value may correspond to a level of confidence that the detected first item is still present at a first location where the detected first item was most recently sensed.

In some embodiments, a system is disclosed that manages retail product inventory using a decay or confidence engine. The decay engine may assign a level of confidence to a tag, identifier, product or the like (referred to generally as tag) and may update the level of confidence over time. By one approach, the tag may, for example, correspond to a radio frequency identification (RFID) tag or other remotely detectable identifier (e.g., bar code, serial number, etc.). The tag may include one or more serialized numbers, alphanumeric characters, and/or other information for an item, which may distinguish the item from other products, other items, and/or uniquely identify the particular item. By another approach, the tag may include at least one of electronic product code (EPC) tags on products, EPC tags on fixtures or other no-sellable items, or a "tag" of a universal product code (UPC) and serial number combination associated with a sellable or non-sellable item. The tag may also include anything that can be differentiated from other things based on a serial code. In a retail environment, this may include items for sale and fixtures. When a reader (e.g., the RFID reader) reads the tag, information that are read and obtained by the reader may include, for example, information particular to the tag, time of the read, information particular to the reader, location of where the reader read the tag, other such information, and often a combination of two or more of such information. In one example, the reader may be fixed, handheld, standalone, or integrated with another device, or any combination thereof.

In an implementation, the confidence value may correspond to a level of assurance that the item is at a particular location. The confidence value may decay over time. For example, a tag (e.g., an RFID tag) is read by a reader (e.g., an RFID reader) at a particular location. In the system, the tag (and the item associated with the tag) is then considered to be at the particular location, at least for a period of time. By one approach, a decay rate may be associated with the tag based on various read characteristics and/or factors providing a particular level of confidence that the tag is still at the particular location at a particular time. The read characteristics and/or factors may include a sensor decay rate, a location decay rate, a period of time of decay, other decay rate that may affect the particular level of confidence that the tag is still at the particular location, or any combination thereof. Thus, each item that is associated with a particular product may have its corresponding decay rate based at least on one or more of the sensor decay rate, the location decay rate, the period of time of decay, or other decay rate that may affect a level of confidence associated with each item.

By one approach, the sensor decay rate may be based on characteristics associated with the reader (or sensor associated with the reader). The characteristics of the reader may include sensitivity of the sensor, age of any material or electrical components of the reader, housing design of the reader, mounting location of the reader, or any characteristics that may affect read sensitivity of the reader.

Moreover, the location decay rate may be based on a particular area of the retail shopping facility. For example, the particular area may correspond to an entrance area of the retail shopping facility. In another example, the particular area may correspond to an isolated area at the back of the retail shopping facility. The entrance area may typically receive heavier volume of customer traffic (thus, a higher location decay rate) than the isolated area of the retail shopping facility. Furthermore, each area of the retail shopping facility may include a plurality of zones, where each of the plurality of zones has a corresponding location decay rate. Similarly, each of the plurality of zones may include a plurality of sections each having separate corresponding location decay rate. In some applications, different levels of location accuracy can be applied with corresponding different decay rates based on those levels of location accuracy. For example, broad areas within a shopping facility such as the sales floor versus a back storage area could have one level of confidence, while more specific levels of location accuracy would have different decay rates. Typically, an item is only considered to be at a single location, and accordingly, confidence values may be limited to a single confidence value per level of accuracy. For instance, at a highest level the sales floor and back storage area may be the only areas (e.g., a confidence value can only be applied to a specific tag for either the sales floor or back storage area), while other levels could have different granularity of confidence. Some embodiments enable a different confidence value to be determined for each level of the locations.

By another approach, the period of time of decay may be associated with a particular decay rate. For example, the period of time of decay may be based on a type of product the item is associated with, rate of theft associated with the product, cashier checkout error rate, other characteristics or factors that may affect the level of confidence generally associated with items of the product, or any combination thereof. As such, each day (or other decay period) that an item is determined to be at the particular location for the period of time, a particular decay rate is assigned and applied to the confidence value associated with the item. For example, a reader associated with the particular location has not subsequently read a tag associated with the item since the initial reading of the tag.

To illustrate, on day one, a tag on an item is read by a reader. On day two, in response to an absence of a subsequent tag read by the same or a different reader, a central control system may apply a first decay rate to a confidence value associated with the item (where, in this example, the decay period is one day). On day three, in response to another absence of a subsequent tag read by the reader, the central control system may apply a second decay rate to the confidence value. On day four, the reader may perform a subsequent read on the tag. In response to the reader performing the subsequent read on the tag, the central control system may revise or reset the confidence value based on a confidence reset database. On day five, the central control system may apply the first decay rate to the confidence value that was reset on the fourth day. Thus, determining a confidence value based on at least one of the sensor decay rate, the location decay rate, and/or the period of time of decay for one or more items of a product and assigning the confidence value to corresponding items of the product, provides a particular method of estimating inventory of the product with a particular level of confidence at a time.

In one configuration, the confidence values may be used to make a plurality of business decisions, such as assess whether a product associated with a plurality of items needs replenishing or restocking at a given time. Further, having a particular level of confidence (based on a particular confidence value) that a tag is present or in a particular location is useful in a situation where the tag may not move for a period of time and may not be read by one or more readers. This situation may occur, for example, when a number of items in a retail shopping facility sit in metal bins, shelves, or are in "dead zones." The dead zones may correspond to an area where an item may not be detected by a reader, not covered by any readers, or other such areas where reading tags are difficult or cannot be performed.

In some embodiments, a presence confidence value may be associated with a particular product. The presence confidence value may indicate whether there are sufficient number of tags read (i.e., sufficient number of items) that are associated with the particular product to enable the decay engine to accurately rely on a "presumption" that an item of the particular product is still at a location. By one approach, the presence confidence value may be determined, alternatively or in addition to, determining a confidence value of an item of the particular product. To further describe, the presence confidence value may be associated with a threshold number of items of a product that are determined to be present in the retail shopping facility. In comparison, the confidence value may be associated with a level of confidence that an item of the product may be present in the retail shopping facility. Thus, when the presence confidence value associated with a product is less than a presence confidence threshold, one or more business decision systems may prevent use of confidence values associated with a plurality of items of the product.

In an exemplary scenario where the presence confidence value is less than the presence confidence threshold, the decay engine may continue assigning confidence values to a plurality of items. The decay engine may store the confidence values in at least one of a memory or a database associated with an inventory system. In another exemplary scenario, when the presence confidence value is greater than the presence confidence threshold, the one or more business decision systems may start determining whether one or more business actions are implemented based on the confidence values. In some instances, different presence confidence thresholds are associated with different decision business systems and/or different presence confidence thresholds may be applied to different products.

Figure 1:
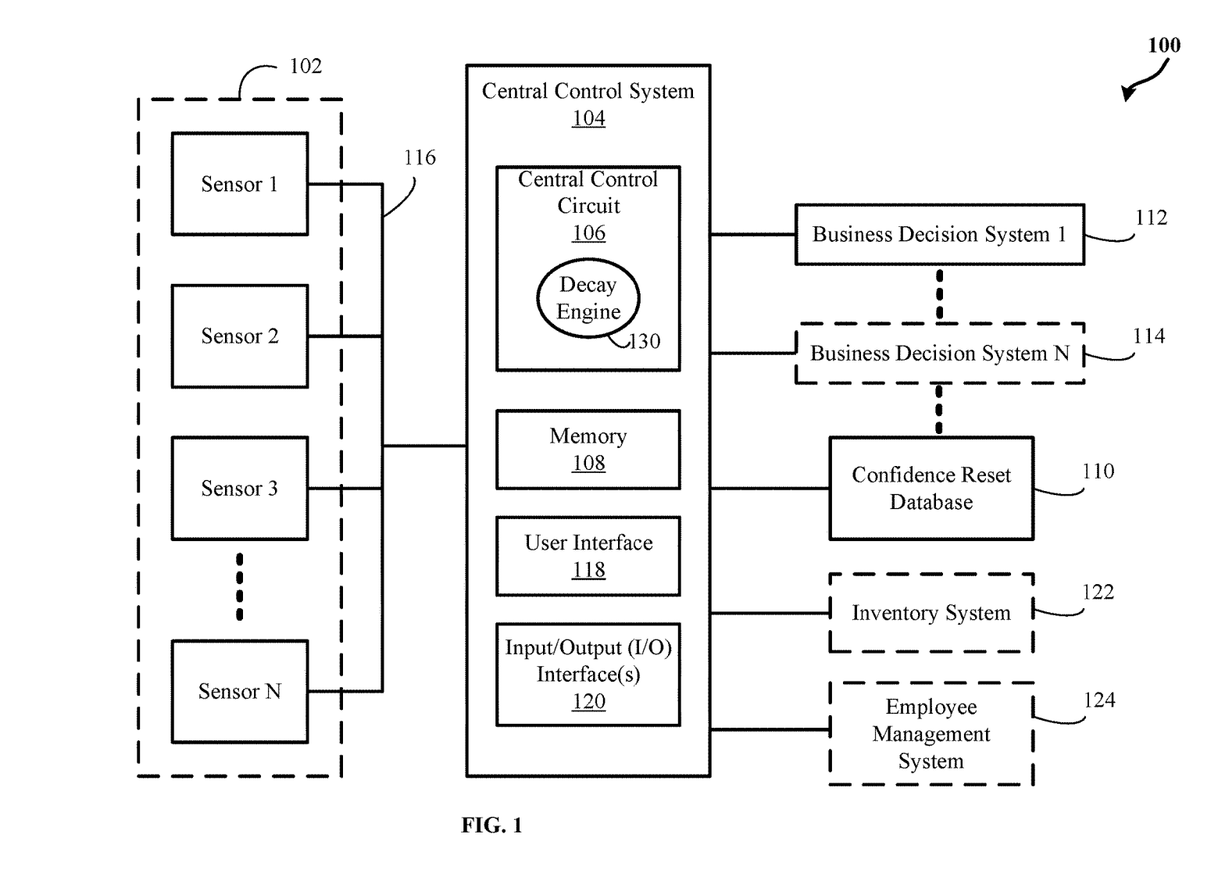
FIG. 1 is a block diagram of an exemplary representation of a system for managing retail product inventory in accordance with some embodiments.

Reference will now be made to FIG. 1 which shows a representative block diagram of an inventory management system 100 for managing retail product inventory, in accordance with some embodiments. The inventory management system 100 includes a plurality of sensors 102. The plurality of sensors 102 may detect individual presence of each of multiple different products within a retail shopping facility. The plurality of sensors 102 may correspond to a plurality of RFID sensors, a plurality of optical sensors, and/or a plurality of readers configured to read one or more tags, where the one or more tags may correspond to RFID tags, EPC tags on products, EPC tags on fixtures or other no-sellable items, and/or "tags" of UPC and serial number combination associated with sellable or non-sellable items.

The plurality of sensors 102 may be distributed through the retail shopping facility. The inventory management system 100 may include a central control system 104 that is communicatively coupled with the plurality of sensors 102 to receive sensor information including identifiers of each product detected by the plurality of sensors 102. The central control system 104 may include the decay engine 130 described in the previous paragraphs and further below. The identifiers may correspond to an EPC, an UPC, a global trade item number (GTIN), a serialized global trade item number (SGTIN), a European Article Number (EAN), other such identifiers, or combination of identifiers. The plurality of sensors 102 may communicate with the central control system, and in some instances with one or more other sensors via a communication bus or network 116 and/or a distributed computer and/or communication network (not shown).

The central control system 104 may include a central control circuit 106 coupled with memory 108. The memory 108 stores at least code that when implemented causes the central control circuit 106 to access the received sensor information. The central control circuit 106 may implement and/or correspond to some or all of the decay engine described in the previous paragraphs and further below. The central control circuit 106 may also be configured to determine, at a current time and for each detected item of a plurality of items, a confidence value corresponding to a level of confidence that the detected item is still present at a location where the detected first item was most recently sensed. In some embodiments, the confidence value is determined as a function of time from a most recent sensing of the detected item such that the confidence value decays over time proportional to a corresponding decay period of time. By one approach, the central control circuit 106 may obtain or determine a sensor decay rate corresponding to a type of sensor that detected the presence of the detected item. The sensor decay rate may correspond to the reader decay rate described in the previous paragraphs.

For example, at a first time, an associate of a retail shopping facility may restock a shelf with a plurality of items of a product, where the shelf is located on a first area of the sales floor of a retail shopping facility. A first sensor of the plurality of sensors 102 may detect and read each tag that is associated with each of the plurality of items. The first sensor may be a handheld reader, a fixed reader mounted on at least one of a ceiling, a wall, a shelf, a post, or other type of structure mountable by the reader, a mobile reader, or other such reader. Information read by the first sensor includes identifiers of the plurality of items. In another example, a second sensor of the plurality of sensors 102, at the first time, may also detect and read the tags associated with one or more items of the plurality of items. The second sensor may be located a distance away from the plurality of items and may or may not be partially obstructed by an object.

In one configuration, the first and second sensors of the plurality of sensors 102 may send sensor information including the information read from the tags of the plurality of items to the central control circuit 106. The central control circuit 106 may initially determine and/or provide a confidence value for each detected item of the plurality of items based on the sensor information received from at least one of the first sensor or the second sensor. The sensor information may be received via the central control system 104. At a second time, the central control circuit 106 may decay the confidence value associated with one or more of the items at a decay rate (of potentially one or more different decay rates) proportional to a first decay period of time. The first decay period of time may correspond to a period between the first time and the second time. The decay period of time may correspond to a period of one or more hours, a part of a work shift, a work shift, a day, a week, a month, or other such period. Further, the decay period may be different for different products, may be different for different times of a day, week, year, etc., may be different for shopping facilities, and/or other such factors. The central control circuit 106 may continue decaying the confidence value as a function of the day period of time until at least one of the first sensor, the second sensor, or another sensor of the plurality of sensors 102 subsequently reads the corresponding tag associated with the confidence value.

By one approach, a determination of the sensor decay rate may be based at least in part on a sensor's model type, brand, manufacturer, and/or whether the sensor is handheld, fixed, and/or user configured. Each of the plurality of sensors 102 may be assigned a particular sensor decay rate by the central control circuit 106. In response to determining a confidence value, the central control circuit 106 may determine the confidence value decayed as a function of the sensor decay rate and the corresponding decay period of time. Thus, accuracy of estimating an inventory of a particular product in an inventory system 122 on a particular time may be improved based on, at least in part, by taking into account particular characteristics, placement locations, and/or specifications associated with each of the plurality of sensors 102 in determining a confidence value associated with a particular item of a product for a period of time. Level of accuracy is based on how close the estimated inventory of the product based on confidence values associated with the plurality of items of the product relative to an actual inventory count at the same time (e.g., if an accurate physical inventory count of the product would have been performed).

By another approach, the central control circuit 106 may also determine a location decay rate corresponding to the first location where the detected first item was most recently sensed by one of the plurality of sensors 102. In one configuration, the first location may correspond to an area within a first threshold area where the detected first item was most recently sensed. In determining a confidence value of the detected first item, the central control circuit 106 may determine the confidence value as a function of the sensor decay rate, the location decay rate, other related decay rates, the first decay period of time, or any combination thereof. The central control circuit 106 may correspond to the decay engine described in the previous paragraphs and further below.

For example, a first location decay rate may be associated with a first area of a retail shopping facility. A second location decay rate may be associated with a second area of the retail shopping facility. The first location decay rate may be greater than the second location decay rate, for example, due to heavier customer traffic at the first are compared to the second area, the first area being closer to an exit, the first area having greater numbers and/or diversities of products, the types of products placed in the first area (e.g., smaller items, higher rate of sale items, etc.), other such factors, or combination of two or more of such factors. In some configurations, the central control circuit 106 may decay the confidence value based on the location decay rate. In other configurations, the central control circuit 106 may decay the confidence value based on the first decay period of time, alternatively or in addition to the sensor decay rate, the location decay rate, other decay rate or combination of two or more of such decay rates.

Further, the central control system 104 may include a user interface 118. The user interface 118 may correspond to a keyboard, a touchscreen, mouse, buttons, other such systems to interact with the central control system and/or an adapter interface where a user may communicate with the central control system 104 via a laptop, a smartphone, a tablet, server, and/or other such devices. The central control system 104 may also include one or more input/output (I/O) interfaces 120. Via the one or more I/O interfaces 120, the central control system 104 may communicate to one or more business decision systems 112, 114, servers, databases, third party services, the Internet and/or other systems. A confidence reset database 110 may also communicate to the central control system 104 via the one or more I/O interfaces 120. The one or more I/O interfaces 120 may correspond to a software I/O interface and/or a hardware I/O interface. By one approach, the confidence reset database 110 and the one or more business decision systems 112, 114 may each communicate to the central control system 104 via a separate I/O interface of the one or more I/O interfaces 120. In some embodiments, the central control system 104 may include some or all of the confidence reset database 110.

The confidence reset database 110 may include separate sensor identifiers for each sensor of the plurality of sensors 102. The confidence reset database 110 may associate with each sensor identifier one or more reset confidence values, where two or more sensors of the plurality of sensors 102 have different reset confidence values based at least in part on a type of sensor. Similarly, a reset confidence value may be dependent on a location of the sensor, an area where a product is detected, and/or other such factors. In one scenario, upon receiving sensor information from the first sensor of the plurality of sensors 102, the central control circuit 106 may access the confidence reset database 110 and may identify a first reset confidence value corresponding to the first sensor. The central control circuit 106 may increase the confidence value of the detected first item based on the indication that the first sensor detected the item and the first reset confidence value.

In some embodiments, the confidence reset database 110 may include a plurality of databases storing a plurality of data including the location decay rate, the sensor decay rate, and item tag decay rate. In one example, data included in a first database of the plurality of databases may include at least one of the location decay rate, the sensor decay rate, and the item tag decay rate. In one scenario, the detected first item may be associated with an item tag (or item identifier) readable by one of the plurality of sensors 102. By one approach, the confidence reset database 110 may include a plurality of associations, such as associations of location decay rates with locations, areas, regions, and/or space designations of a retail store. In such an approach, the space inside the retail store is designated, divided and/or subdivided into various locations, areas, and/or regions. For example, the retail store has locations (or spaces) that are designated as a general retail store backroom region, a general retail store sales floor region, an area of the general retail store backroom region that is near receiving door(s), and/or an area of the general retail store sales floor region that is near customer exit(s). In another example, each particular location, region, area, and/or space designation of the retail store may be associated with a particular x,y,z coordinate of the retail store. In such an example, the confidence reset database 110 may also include x,y,z coordinates of the retail store.

Alternatively or in addition to, the plurality of associations stored in the confidence reset database 110 may include associations of sensor decay rates with the plurality of sensors 102. Alternatively or in addition to, the plurality of associations stored in the confidence reset database 110 may include associations of item tag decay rates with item tags associated with items of a plurality of products. In an illustrative non-limiting example, the central control circuit 106 may receive sensor information from a particular sensor of the plurality of sensors 102 (or from one or more sensors of the plurality of sensors 102). The sensor information may include an item tag read by the particular sensor and a sensor identifier of the particular sensor. By one approach, based on the sensor identifier, the central control circuit 106 may access the confidence reset database 110 to obtain a location associated with the sensor identifier. In such an approach, with the determination of the location associated with the sensor identifier, the central control circuit 106 may determine the particular x,y,z coordinate of the item tag relative to the retail store. In one configuration, based on the location, the central control circuit 106 may access the confidence reset database 110 and determine a corresponding location decay rate associated with the location where the item tag was recently read or sensed. Alternatively or in addition to, the central control circuit 106 may access the confidence reset database 110 and determine a corresponding sensor decay rate of the particular sensor that read the item tag. By one approach, based on the particular sensor, the central control circuit 106 may access the confidence reset database 110 and determine a corresponding sensor decay rate of the particular sensor that recently read or sensed the item tag. Alternatively or in addition to, the central control circuit 106 may update a confidence value associated with the item tag in the confidence reset database 110 based on the location decay rate and/or the sensor decay rate. Alternatively or in addition to, the central control circuit 106 may access the confidence reset database 110 and determine a corresponding item tag decay rate of the item tag associated with an item. By one approach, based on the item tag, the central control circuit 106 may access the confidence reset database 110 and determine a corresponding item tag decay rate of the item tag that was recently read or sensed. In such an approach, the central control circuit 106 may update a confidence value associated with the item tag in the confidence reset database 110 based on the location decay rate, the sensor decay rate, and/or the item tag decay rate. In one configuration, the central control circuit 106 may update the confidence reset database 110 with the determined location decay rate, the sensor decay rate, and/or the item tag decay rate. For example, the central control circuit 106 may determine a location of the item when the item was most recently read based on the sensor that most recently read the item tag associated with the item. In one configuration, the central control circuit 106 may associate a location decay rate with the item and/or the item tag in the confidence reset database 110 based on the determined location of the item. Alternatively or in addition to, the central control circuit 106 may associate a sensor decay rate with the item and/or the item tag in the confidence reset database 110 based on the sensor that most recently read the item tag. Alternatively or in addition to, the central control circuit 106 may associate, in the confidence reset database 110, an item tag decay rate with the item and/or the item tag. The item tag decay rate may be based on an item tag's type, manufacturer, vendor, lot number, serial numbers, and/or among other ways to group a set of tags. As such, by one example, when at least one of the plurality of sensors read an item tag, the central control circuit 106 may update a stored confidence value associated with the item tag and/or an item associated with the item tag. In another example, the central control circuit 106 may associate with the item tag and/or the item the location decay rate, the sensor decay rate, and/or the item tag decay rate based on the most recent reading of the item tag.

In some embodiments, at a particular time, the central control circuit 106 may determine a confidence value corresponding to a level of confidence that the item tag (therefore, the item associated with the item tag) is still present at the location based on the location decay rate of the location, the sensor decay rate of the particular sensor, and/or the item tag decay rate of the item tag at the particular time. In one configuration, the central control circuit 106 may update a stored confidence value associated with the item tag in the confidence reset database 110 with the determined confidence value at the particular time.

In some embodiments, values associated with the location decay rate, the sensor decay rate, and/or the item tag decay rate may be stored in the confidence reset database 110 at a first time based on a plurality of read or sensed patterns associated with a plurality of item tags over a period of time. In an illustrative non-limiting example, the central control circuit 106 may determine one or more read or sensed patterns indicating that for a particular period of time a number of item tags are read or sensed and/or not read or sensed by one or more of the plurality of sensors 102. By one approach, the central control circuit 106 may determine the read or sensed patterns based on frequency of successful read or sense of a number of item tags at one or more locations in the retail store. In one configuration, based on the determined read or sensed patterns, at least one of the central control circuit 106 or a user associated with the retail store, may assign initial values associated with the location decay rates, the sensor decay rates, and/or the item tag decay rates that are stored in the confidence reset database 110. In another configuration, the assigned initial values associated with the location decay rates, the sensor decay rates, and/or the item tag decay rates stored in the confidence reset database 110 may be based on historical values associated with location decay rates, sensor decay rates, and/or item tag decay rates of a second retail store.

In another configuration, the central control circuit 106 may update the stored values associated with the location decay rates, the sensor decay rates, and/or the item tag decay rates in the confidence reset database 110 based on subsequent determined read or sensed patterns and/or read or sensed frequency test performed by the central control circuit 106 and/or the user associated with the retail store, such as, for example, employees, associates, and/or contractors of the retail store.

In some embodiments, the inventory management system 100 may include and/or be in communication with one or more business decision systems 112, 114. Each of the multiple business decision systems may utilize one or more corresponding business decision thresholds of a plurality of business decision thresholds relative to a confidence threshold associated with a plurality of items and particular to the first business decision system in determining whether to cause a corresponding business action to be implemented. For example, a first business decision system 112 may obtain from the central control system 104 confidence values of the plurality of items of the product. The first business decision system 112 may initiate a first business action when a predefined relationship exists between the confidence values and a first business decision threshold of a plurality of business decision thresholds.

By one approach, the predefined relationship may correspond to a confidence threshold. Based on the confidence threshold, the first business decision system 112 may initiate the first business action. For example, the first business decision system 112 may obtain, from the central control system 104, confidence values associated with a number of detected items of a product. Each of the confidence values may be compared to a first confidence threshold of one or more confidence thresholds associated with the first business decision system 112. Each confidence threshold may be specific to a particular business decision to be evaluated and/or made by the business decision system 112. In some embodiments, when a confidence value of an item does not have the predetermined relationship with the first confidence threshold (e.g., is less than the first confidence threshold), the business decision system considers that item associated with the confidence value as no longer being at the location within the shopping facility, and in some instances not within the shopping facility. In such instances, the business decision system considers the first confidence value for that item to be too low to have sufficient confidence that the item is actually at the location. Alternatively, when a confidence value of an item has the predetermined relationship with the first confidence threshold being applied by the business decision system (e.g., greater than, equal to or some other predefined relationship with the confidence threshold), the business decision system considers that item as being present at the previously detected location, and in some instances increments an item count for each item of a product that has a confidence value that has the predetermined relationship with the first confidence threshold.

Based on the detection that one or more items of one or more products being evaluated by the business decision system have a confidence value that has the predetermined relationship with the first confidence threshold, the business decision system can further evaluate those items relative to business parameters and/or one or more business decision thresholds corresponding to one or more business decisions to be made. In some embodiments, the business decision system can determine whether the item count of items of a product has a predetermined relationship with a business decision threshold. As one example, the business decision system 112 may, in making a first business decision, receive 35 confidence values corresponding to 35 different items detected over a period of time, where one or more of those 35 confidence values may have been reduced over time based on one or more decay rates. Of those 35 confidence values, the business decision system may determine that 19 items have a confidence value greater than the first confidence threshold, and accordingly, the business decision system may consider, in making the first business decision, that there are 19 of the items at the one or more locations. The item count of 19 items of the product can be compared with at least the first business decision threshold to determine whether the item count is, for example, less than the first business threshold. When the item count is, in this example, less than the first business decision threshold, then the business decision system can initiate a business action (e.g., placing an order with a distribution center to replenish items of the product at the shopping facility, causing a notification to be forwarded to a worker at the shopping facility to pick items of the product and/or restock shelves on the sales floor, directing instructions to a worker to perform a physical count, or other such business decisions).

In one configuration, the first business action may include sending one or more notifications. The one or more notifications may include information associated with the confidence values and the first business decision threshold, a request to restock shelves with another set of a plurality of items of the product associated with the detected first item, a request to replenish inventory of the product with a second set of a plurality of items of the product from at least one vendor, a message that the product has reached a particular depletion rate based on the determination that the first business decision threshold has been reached, and/or other such notifications. In other examples, the first business action may include determining one or more items and/or quantities of one or more items associated with the product to pick, requests for accounting of remaining items of the product, direct one or more workers of the shopping facility to perform a count of items of the product, auto-on-hand adjustments of inventory levels of the product, and/or other such actions.

In another example, the one or more notifications may be sent to an associate of the retail shopping facility via an employee management system 124. The employee management system 124 communicatively couples to at least one of the central control system 104 and the central control circuit 106, and may communicate with associates of the retail shopping facility via a user interface device associated with the shopping facility associate. The user interface device may include a smartphone, a tablet, a laptop, a server, a display device, a public communication system, or other such device.

The central control system 104 may include and/or communicatively couple with a second business decision system 114 of the multiple business decision systems that is different than the first business decision system 112. The second business decision system 114 may obtain from the central control system 104 the confidence values. The second business decision system 114 may prevent initiation of a second business action when a second predefined relationship exists between the confidence values and a second business decision threshold of the plurality of business decision thresholds.

By one approach, the second predefined relationship may correspond to a second confidence threshold. Based on the second confidence threshold, the second business decision system 114 may initiate the second business action. For example, the second business decision system 114 may obtain, from the central control system 104, the confidence values associated with the number of detected items of the product. Each of the confidence values are compared to a second confidence threshold of a plurality of confidence thresholds associated with the second business decision system 114. Based on the comparison, the second business decision system 114 may determine the confidence values that are equal to or greater than the second confidence threshold. Alternatively, the second business decision system 114 may determine the second confidence values that are less than the second confidence threshold. As such, if the determined number of the confidence values has reached the second business decision threshold, the second business action may be initiated.

By another approach, each of the multiple business decision systems may utilize a plurality of confidence thresholds, where each of the plurality of confidence thresholds may be associated with one or more of the plurality of business decision thresholds.

Further, the second business action may include at least one of sending a second notification regarding information associated with the confidence values and the second business decision threshold, a second request to restock shelves with another set of a plurality of items of the product associated with the detected first item, a second request to replenish inventory of the product with a second set of a plurality of items of the product from at least one vendor, sending a message that the product associated with the detected first item has reached a particular depletion rate based on the determined number of the confidence values reaching the second business decision threshold, determining one or more items associated with the product to pick, requesting for accounting of inventory of the product and/or auto-on-hand adjustments of inventory levels of the product, and/or other such actions. In some embodiments, information regarding inventory levels of one or more products are provided by the inventory system 122.

In another implementation, the central control circuit 106 may determine a presence confidence value based on a number of detected items of the plurality of items relative to an expected inventory of the plurality of items in at least a first area within the retail shopping facility. The business decision systems 112, 114 may prevent use of the confidence values of the plurality of items in making a business decision relative to a product of the plurality of products when the presence confidence value is less than a first presence confidence threshold. In other words, if one or more of the plurality of sensors 102 do not detect at least a predetermined amount of a plurality of items of a product (i.e., the presence confidence value is less than the first presence confidence threshold), the confidence values associated with the plurality of items are not used by one or more of the business decision systems 112, 114. Different business decision systems may apply the same or different presence confidence values. In some embodiments, one or more of the business decision systems 112, 114 may start using the confidence values when the central control circuit 106 and/or the business decision system determines that the presence confidence value is greater than presence confidence threshold corresponding to the business decision system.

In some embodiments, the central control circuit continuously uses sensor information received from one or more sensors and continuously determines confidence values and/or presence confidence values of one or more items and/or one or more products. In other instances, the confidence values and/or presence confidence values may be evaluated in response to a request by a business decision system. By one approach, the central control circuit 106 may receive a request from the first business decision system 112 for confidence value of detected items of a first product. In response to the request from the first business decision system 112, the central control circuit 106 may initiate the determination of the confidence value.

Figure 2:
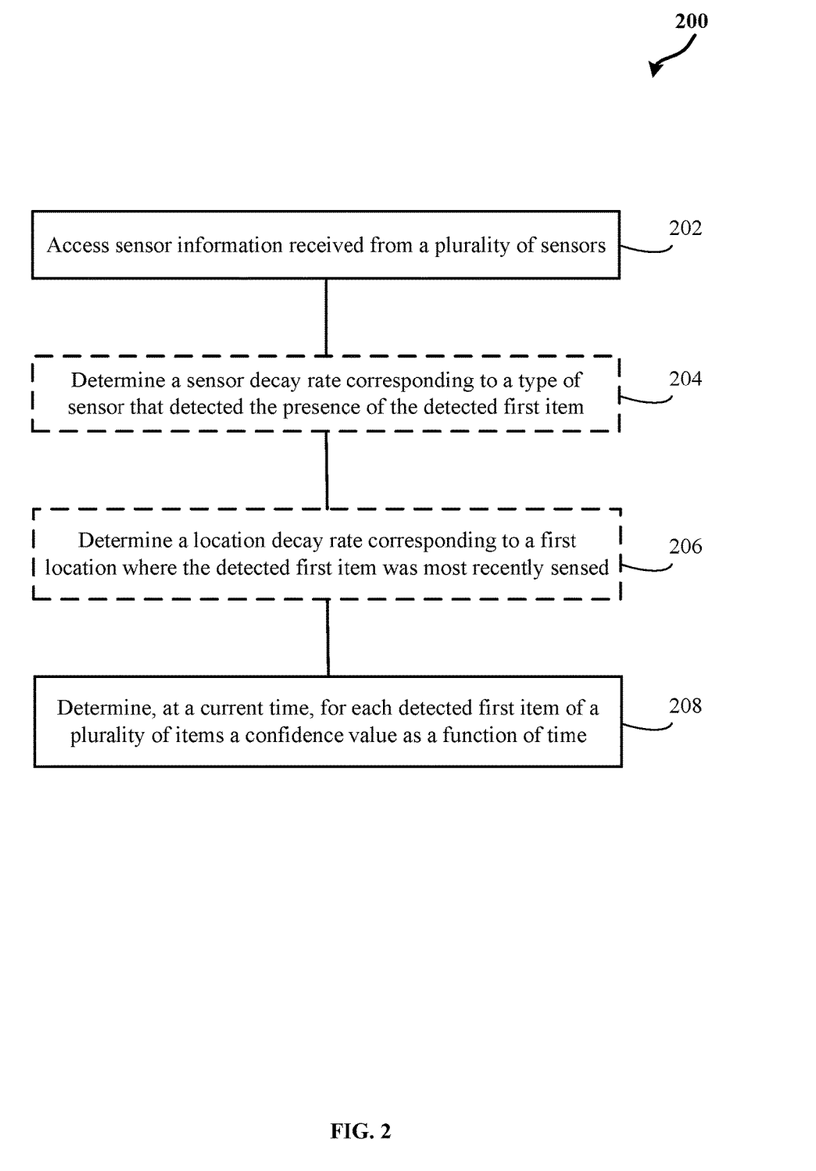
FIG. 2 is an exemplary flow diagram of a method for managing retail product inventory in accordance with several embodiments.

FIG. 2 illustrates an exemplary flow diagram of a method 200 for managing retail product inventory in accordance with some embodiments. The method 200 may be implemented in the system 100 of FIG. 1. By one approach, the method 200 may be implemented in at least one of the central control system 104 or the central control circuit 106 of FIG. 1. The method 200 includes accessing sensor information received from a plurality of sensors distributed through a retail shopping facility, at step 202. The plurality of sensors may detect individual presence of each of a plurality of items of a plurality of products within the retail shopping facility. The sensor information may include identifiers of each of the plurality of items detected by the plurality of sensors. The plurality of sensors may correspond to the plurality of sensors 102 of FIG. 1. The identifiers may include at least one of an EPC, a UPC, a global trade item number (GTIN), a SGTIN, and/or a European Article Number (EAN). The sensor information may include additional information, such as one or more of a sensor identifier of the sensor 102 that detects an item tag, a sensor type information of a sensor that detects the item tag, sensor location information, time an item tag was detected, tag type identifying information, other such information, or combination of two or more of such information. Additionally or alternatively, the central control system may have access to or knowledge of some of such information, such as type of sensor, location of sensor, and/or other such information.

The method 200 may include, at step 204, the optional step of determining a sensor decay rate corresponding to a type of sensor that detected presence of an item. At step 206, the method 200 may also include the optional step of determining a location decay rate corresponding to a first location where the detected item was most recently sensed. The method 200 may also include, at step 208, determining, at a current time, for each detected item of a plurality of items a confidence value as a function of time from a most recent sensing of the detected item such that the confidence value decays over time proportional to a decay rate and a decay period of time corresponding to a product and/or item being considered. The confidence value may correspond to a level of confidence that the detected item is still present at the first location where the detected item was most recently sensed. Determining the confidence value may include determining the confidence value as a function of at least one of the sensor decay rate, the location decay rate, or the first decay period of time.

Figure 3:
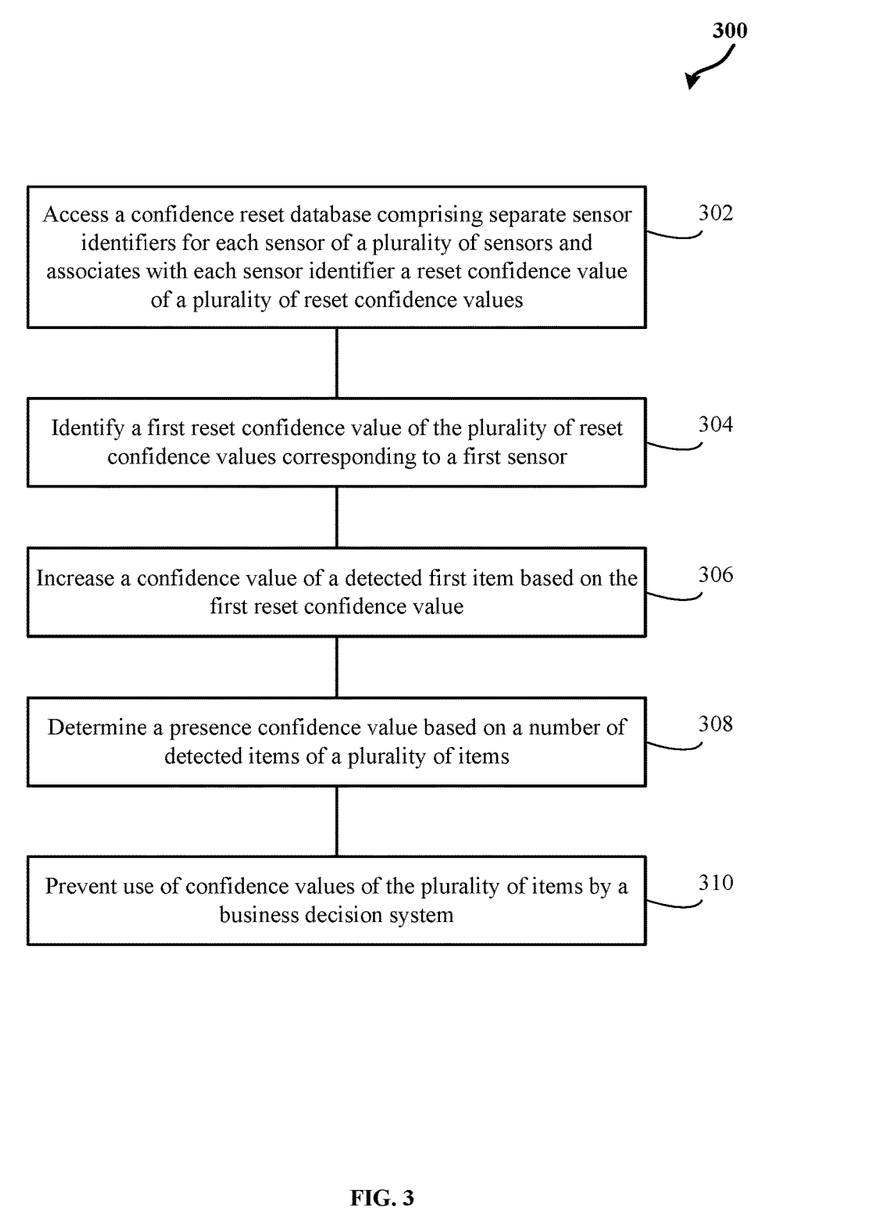
FIG. 3 is an exemplary flow diagram of a method for managing retail product inventory in accordance with some embodiments.

FIG. 3 illustrates an exemplary flow diagram of a method 300 for managing retail product inventory in accordance with some embodiments. The method 300 may be implemented in the system 100 of FIG. 1. By one approach, the method 300 may be implemented in at least one of the central control system 104, the central control circuit 106 of FIG. 1, or the one or more of the business decision systems 112, 114. By another approach, the method 200 of FIG. 2 may include the method 300. At step 302, the method 300 includes accessing, based on receiving sensor data from a first sensor that a first product was sensed, a confidence reset database comprising separate sensor identifiers for each sensor of the plurality of sensors and associates with each sensor identifier a reset confidence value of a plurality of reset confidence values. Typically, two or more sensors have different reset confidence values based on a type of sensor, a location of the sensor, a type of tag being detected, and/or other such factors. The first sensor and/or the two or more sensors may correspond to one or more sensors of the plurality of sensors 102 of FIG. 1. The confidence reset database may correspond to the confidence reset database 110 of FIG. 1.

The method 300 may also include identifying a first reset confidence value of the plurality of reset confidence values corresponding to the first sensor, at step 304. At step 306, the confidence value of the detected item may be increased based on the first reset confidence value. In some instances, for example, the confidence value of the detected item is reset to equal the reset confidence value specified in the confidence reset database. In other instances, the reset confidence value may define a multiplier that is multiplied by the current confidence value. Other reset confidence values may be used. The method 300 may include determining a presence confidence value based on a number of detected items of the plurality of items relative to an expected inventory of the plurality of items in at least a first area within the retail shopping facility, at step 308. When the presence confidence value is less than a presence confidence threshold corresponding to a business decision system, use of confidence values of the plurality of items by the business decision system in making a business decision relative to a product of the plurality of products is prevented, at step 310.

Figure 4:
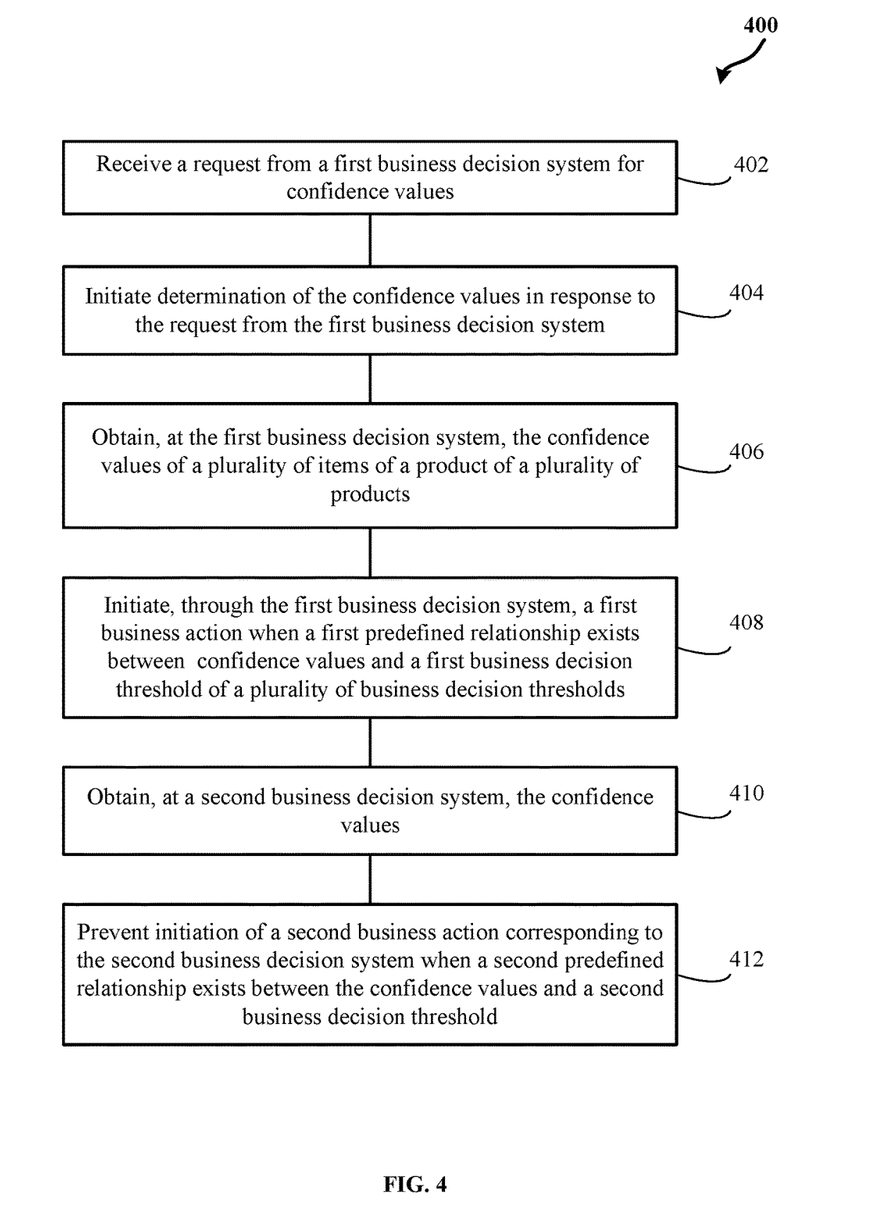
FIG. 4 is an exemplary flow diagram of a method for managing retail product inventory in accordance with some embodiments.

FIG. 4 illustrates another exemplary flow diagram of a method 400 for managing retail product inventory in accordance with some embodiments. The method 400 may be implemented in the system 100 of FIG. 1. By one approach, the method 400 may be implemented in at least one of the central control system 104, the central control circuit 106 of FIG. 1, or the one or more of the business decision systems 112, 114. By another approach, the method 400 and/or one or more steps of the method may optionally be included in and/or performed in cooperation with the method 200 of FIG. 2 or the method 300 of FIG. 3. The method 400 may include receiving a request from a first business decision system of multiple business decision systems for confidence values, at step 402. In response to the request from the first business decision system, determination of the confidence values may be initiated, at step 404. In other implementations, the confidence values may have continuously been maintained and/or determined within a threshold period of time, and the previously determined confidence values for those items may be retrieved (e.g., from a database). The method 400 may also include obtaining, at the first business decision system, the confidence values of a plurality of items of a product of a plurality of products, at step 406.

Each of the multiple business decision systems are configured to utilize corresponding one or more business decision thresholds of a plurality of business decision thresholds relative to the confidence values in determining whether to cause a corresponding business action to be implemented. As described above, a business decision system, in some embodiments may evaluate confidence values of items relative to one or more confidence thresholds in determining whether there is a sufficient confidence relative to the business decision that an item is still at a location. The business decision system can generate an item count of the items where the confidence value meets a confidence threshold. At step 408, when a first predefined relationship exists between the confidence values and a first business decision threshold of the plurality of business decision thresholds, a first business action may be initiated through the first business decision system. For example, a business decision system may determine whether an item count determined based on the confidence values of the items has a predefined relationship with one or more business decision thresholds. The first business action may include sending one or more notifications. For example, the first business action may be initiated by the first business decision system 112 of FIG. 1. In another example, at least one of the inventory system 122, the employee management system 124 of FIG. 1, and/or one or more systems associated with the retail shopping facility may receive one or more notifications, messages, or signals indicative of the first business action initiated by the first business decision system.

Moreover, the one or more notifications may include information associated with the confidence value and the first business decision threshold, a request to restock shelves with another set of a plurality of items of the product associated with the detected item, a request to replenish inventory of the product with a second set of a plurality of items of the product from at least one vendor, and/or a message that the product has reached a particular depletion rate based on the first business decision threshold. In another example, the first business action may include determining one or more items associated with the product to pick, requests for accounting of remaining items of the product, and auto-on-hand adjustments of inventory levels of the product.

In some embodiments, the method 400 may, at step 410, optionally obtain, at a second business decision system of the multiple business decision systems, the confidence values. The second business system is different than the first business decision system. For example, the second business decision system may correspond to the second business decision system 114 of FIG. 1.

At step 412, when a second predefined relationship exists between the confidence values and a second business decision threshold of the plurality of business decision thresholds, initiation of a second business action corresponding to the second business decision system may be prevented. Further, when the predetermined relationship exists, the second business decision system may cause one or more notifications to be issued to one or more other systems and/or components of the system 100 (e.g., the inventory system 122, the employee management system 124 of FIG. 1, and/or the one or more systems associated with the retail shopping facility).

Similarly, when it is determined relative to step 412 that the predetermined relationship does not exist, the second business decision system causes one or more second business actions to be initiated. The second business action may include, for example, sending a second notification regarding information associated with the confidence values and the second business decision threshold, a second request to restock shelves with another set of a plurality of items of the product associated with the detected item, a second request to replenish inventory of the product with a second set of a plurality of items of the product from at least one vendor, sending a message that the product associated with the detected item has reached a particular depletion rate based on the second business decision threshold, determining one or more items associated with the product to pick, requesting for accounting of inventory of the product and/or auto-on-hand adjustments of inventory levels of the product, or other such actions.

The methods, techniques, systems, devices, services, servers, sources and the like described herein may be utilized, implemented and/or run on many different types of devices and/or systems. The central control system 104 and/or the central control circuit 106 of FIG. 1 may be implemented as one or more processor devices. The memory 108 of FIG. 1 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 108 is shown as internal to the central control system 104; however, the memory 108 can be internal, external or a combination of internal and external memory. Additionally, the system 100 of FIG. 1 typically includes a power supply (not shown), which may be rechargeable, and/or it may receive power from an external source. Various components in FIG. 1 may be coupled together via a bus or one or more distributed networks. It is understood that the various components may actually be coupled to the central control system 104 and/or the central control circuit 106 and/or one or more other components directly.

Generally, the central control system 104, the central control circuit 106, and/or electronic components of the system 100 can comprise fixed-purpose hard-wired platforms or can comprise a partially or wholly programmable platform. These architectural options are well known and understood in the art and require no further description here. The system 100, the central control system 104, and/or the central control circuit 106 can be configured (for example, by using corresponding programming as will be well understood by those skilled in the art) to carry out one or more of the steps, actions, and/or functions described herein. In some implementations, the central control system 104, the central control circuit 106, and the memory 108 may be integrated together, such as in a microcontroller, application specification integrated circuit, field programmable gate array or other such device, or may be separate devices coupled together.

The one or more I/O interfaces 120 of FIG. 1 allow wired and/or wireless communication coupling of the system 100 to external components and/or or systems. Typically, the one or more I/O interfaces 120 provide wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 118 of FIG. 1 may be used for user input and/or output display, such as the display of a point of sale terminal or an associate device. For example, the user interface 118 may include any known input devices, such one or more buttons, knobs, selectors, switches, keys, touch input surfaces, audio input, and/or displays, etc. Additionally, the user interface 118 include one or more output display devices, such as lights, visual indicators, display screens, etc. to convey information to a user, such as but not limited to communication information, status information, notifications, errors, conditions, and/or other such information. Similarly, the user interface 118 in some embodiments may include audio systems that can receive audio commands or requests verbally issued by a user, and/or output audio content, alerts and the like.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail product inventory management system, comprising:

a plurality of locations within a retail shopping facility, wherein each of the plurality of locations has a corresponding location decay rate associated by a central control system, and wherein each location corresponds to a designated region within the retail shopping facility;

a plurality of radio frequency identification (RFID) sensors distributed throughout the retail shopping facility, wherein each of the plurality of RFID sensors has a corresponding sensor decay rate assigned by the central control system, the plurality of RFID sensors configured to detect individual presence of each of a plurality of items of a plurality of products within the retail shopping facility, wherein the detection of the individual presence of an item by the RFID sensor is an indication to the central control system of the corresponding location in the retail shopping facility the item is located;

a confidence reset database configured to store a plurality of confidence values associated with the plurality of items, wherein each confidence value of the plurality of confidence values corresponds to a particular level of confidence that an associated corresponding item is still at a location where the associated corresponding item was most recently sensed; and the central control system communicatively coupled with the plurality of RFID sensors to receive sensor information comprising identifiers of each of the plurality of items detected by the plurality of RFID sensors, wherein the central control system comprises a central control circuit coupled with the confidence reset database and memory storing code that when implemented causes the central control circuit to:

access the received sensor information;

determine whether each detected first item of the plurality of items is subsequently detected by the plurality of RFID sensors based on the received sensor information;

in response to no subsequent detection of the detected first item, determine, based on an access to the confidence reset database at a current time and for the detected first item, a confidence value of the plurality of confidence values corresponding to a level of confidence that the detected first item is still present at a first location where the detected first item was most recently sensed;

apply a decay rate to the confidence value based on the corresponding sensor decay rate associated with the corresponding RFID sensor that detected the detected first item and the corresponding location decay rate associated with the first location of where the detected first item was most recently sensed, wherein the confidence value is determined as a function of time from a most recent sensing of the detected first item such that the confidence value decays over time proportional to a first decay period of time and the decay rate; and update a stored confidence value associated with the detected first item in the confidence reset database with the decayed confidence value, wherein the updated stored confidence value indicates a lower level of confidence relative to the previous stored confidence value that the associated corresponding item is still at the location.

2. The system of claim 1, wherein the central control circuit is further configured to:

determine a sensor decay rate corresponding to a type of RFID sensor that detected the presence of the detected first item; and in determining the confidence value, determine the confidence value decayed as a function of the sensor decay rate and the first decay period of time.

3. The system of claim 2, wherein the central control circuit is further configured to:

determine the corresponding location decay rate associated with the first location where the first item was most recently sensed via an access to the confidence reset database, wherein, in addition to the corresponding sensor decay rate and the corresponding location decay rate, the decayed confidence value is additionally based on the first decay period of time.

4. The system of claim 1, wherein the confidence reset database further comprises separate sensor identifiers for each RFID sensor of the plurality of RFID sensors and associates with each of the sensor identifiers a reset confidence value, wherein two or more RFID sensors of the plurality of RFID sensors have different reset confidence values based at least in part on a type of RFID sensor, and wherein, upon the receipt of the sensor information by the central control system, the memory storing code further causes the central control circuit to access the confidence reset database and identify a first reset confidence value corresponding to a first RFID sensor of the plurality of RFID sensors, and increase the confidence value of the detected first item based on the first reset confidence value.

5. The system of claim 1, further comprising a first business decision system of multiple business decision systems that are each configured to utilize corresponding business decision threshold of a plurality of business decision thresholds relative to a confidence threshold associated with the plurality of items and particular to the first business decision system in determining whether to cause a corresponding business action to be implemented, wherein the first business decision system is configured to:

obtain from the central control system confidence values of the plurality of items of a product of the plurality of products; and initiate a first business action when a first predefined relationship exists between the confidence values and a first business decision threshold of the plurality of business decision thresholds.

6. The system of claim 5, further comprising a second business decision system of the multiple business decision systems that is different than the first business decision system, wherein the second business decision system is configured to:

obtain from the central control system the confidence values; and prevent initiation of a second business action when a second predefined relationship exists between the confidence values and a second business decision threshold of the plurality of business decision thresholds.

7. The system of claim 5, wherein the central control circuit is configured to:

receive a request from the first business decision system for the confidence values; and initiate a determination of the confidence values in response to the request from the first business decision system.

8. The system of claim 1, further comprising a business decision system communicatively coupled with the central control circuit, wherein the central control circuit is configured to determine a presence confidence value based on a number of detected items of the plurality of items relative to an expected inventory of the plurality of items in at least a first area within the retail shopping facility, and wherein the business decision system is configured to prevent use of confidence values of the plurality of items in making a business decision relative to a product of the plurality of products when the presence confidence value is less than a first presence confidence threshold, wherein the product is associated with the plurality of items.

9. The system of claim 1, wherein the first location is within a first threshold area where the detected first item was most recently sensed.

10. A method of managing retail product inventory comprising:

associating, by a central control system of a retail shopping facility, a corresponding location decay rate with each location of a plurality of locations within the retail shopping facility, wherein each location corresponds to a designated area within the retail shopping facility;

associating, by the central control system, a corresponding sensor decay rate with each radio frequency identification (RFID) sensor of a plurality of RFID sensors distributed through the retail shopping facility and configured to detect individual presence of each of a plurality of items of a plurality of products within the retail shopping facility;

accessing, by the central control system, sensor information received from the plurality of RFID sensors, wherein the sensor information comprises identifiers of each of the plurality of items detected by the plurality of RFID sensors, wherein the detection of the individual presence of an item by the RFID sensor is an indication to the central control system of which area in the retail shopping facility the item is located;

determining whether each detected first item of the plurality of items is subsequently detected by the plurality of RFID sensors;

in response to no subsequent detection of the detected first item, determining, at a current time by the central control system, a confidence value corresponding to a level of confidence that the detected first item is still present at a first location where the detected first item was most recently sensed;

applying a decay rate to the confidence value based on the corresponding sensor decay rate and the corresponding location decay rate; and updating a stored confidence value associated with the detected first item in a confidence reset database with the decayed confidence value, wherein the confidence reset database is configured to store a plurality of confidence values associated with the plurality of items, wherein the updated stored confidence value indicates a lower level of confidence relative to the previous stored confidence value that the associated corresponding item is still at the location.

11. The method of claim 10, further comprising determining the corresponding sensor decay rate based on a type of RFID sensor that detected the presence of the detected first item, wherein the updated stored confidence value is further decayed as a function of a first decay period of time.

12. The method of claim 10, further comprising determining the corresponding location decay rate to associated with the first location where the detected first item was most recently sensed based on the designated area corresponding to the first location.

13. The method of claim 10, further comprising:
upon receiving sensor data from a first RFID sensor of a plurality of RFID sensors indicating that the detected first item was sensed, accessing, by the central control system, a confidence reset database comprising separate sensor identifiers for each RFID sensor of the plurality of RFID sensors and associates with each sensor identifier a reset confidence value of a plurality of reset confidence values, where two or more RFID sensors of the plurality of RFID sensors have different reset confidence values based at least in part on a type of RFID sensor;
identifying a first reset confidence value of the plurality of reset confidence values corresponding to the first RFID sensor; and
increasing the confidence value of the detected first item based on the first reset confidence value.

14. The method of claim 10, further comprising:
obtaining, at a first business decision system of multiple business decision systems, from the central control system confidence values of the plurality of items of a product of the plurality of products, wherein each of the multiple business decision systems are configured to utilize corresponding business decision threshold of a plurality of business decision thresholds relative to the confidence values in determining whether to cause a corresponding business action to be implemented; and
initiating, through the first business decision system, a first business action when a first predefined relationship exists between the confidence values and a first business decision threshold of the plurality of business decision thresholds.

15. The method of claim 14, further comprising:
obtaining, at a second business decision system of the multiple business decision systems, from the central control system the confidence values, wherein the second business decision system is different than the first business decision system; and
preventing initiation of a second business action corresponding to the second business decision system when a second predefined relationship exists between the confidence values and a second business decision threshold of the plurality of business decision thresholds.

16. The method of claim 14, further comprising:
receiving a request from the first business decision system for the confidence values; and
initiating a determination of the confidence values in response to the request from the first business decision system.

17. The method of claim 10, further comprising:
determining a presence confidence value based on a number of detected items of the plurality of items relative to an expected inventory of the plurality of items in at least a first area within the retail shopping facility; and
preventing use of confidence values of the plurality of items by a business decision system in making a business decision relative to a product of the plurality of products when the presence confidence value is less than a first presence confidence threshold, wherein the product is associated with the plurality of items.

18. The method of claim 10, wherein the first location is within a first threshold area where the detected first item was most recently sensed.

19. The system of claim 1, further comprising:
an inventory management system coupled to the central control system and comprising a business decision system configured to:
obtain from the central control system the plurality of confidence values associated with the plurality of items of a product via the confidence reset database;
compare each confidence value of the plurality of confidence values with a confidence threshold associated with the business decision system;
in response to a confidence value of the plurality of confidence values being less than the confidence threshold, identify the associated corresponding item of the product as no longer being at the location where the associated corresponding item was most recently sensed by the plurality of sensors;
in response to the comparison, determine whether a count of the plurality of items associated with having a corresponding confidence value of the plurality of confidence values greater than the confidence threshold is less than a business decision threshold;
in response to the determination that the count is less than the business decision threshold, send a notification to an associate of the retail shopping facility via a user interface device associated with the associate; and
the user interface device coupled to the central control system and comprising at least one of: a smartphone, a tablet, a server, a display device, or a public communication system.

20. The system of claim 19, wherein the central control circuit is further configured to determine whether at least a predetermined amount of items of the plurality of items of the product is detected by the plurality of RFID sensors as still being at the location where they were most recently sensed, and wherein, in response, the business decision system is further configured to not obtain from the central control system the plurality of confidence values associated with the plurality of items of the product.

21. The system of claim 1, wherein, prior to the determination of the confidence value associated with the detected first item, the central control circuit is further configured to initially determine whether a request of the confidence value is received from a business decision system coupled to the central control circuit.

22. The system of claim 1, wherein the association of the location decay rate with the corresponding location is based on at least one of: amount of customer traffic, closeness to an exit, quantity of products, and diversities in types of products in the corresponding location.

* * * * *